United States Patent
Ni

(10) Patent No.: US 10,617,491 B2
(45) Date of Patent: Apr. 14, 2020

(54) PASSIVE SELF-LIGATING BRACKET

(71) Applicant: HANGZHOU XINGCHEN 3B DENTAL INSTRUMENT & MATERIAL CO., LTD., Hangzhou (CN)

(72) Inventor: Qijun Ni, Hangzhou (CN)

(73) Assignee: Hangzhou Xingchen 3B Dental Instrument & Material Co., LTD., Hangzhou (CN)

(*) Notice: Subject to any disclaimer, the term of this patent is extended or adjusted under 35 U.S.C. 154(b) by 65 days.

(21) Appl. No.: 15/164,967

(22) Filed: May 26, 2016

(65) Prior Publication Data

US 2017/0007370 A1 Jan. 12, 2017

Related U.S. Application Data

(63) Continuation of application No. PCT/CN2015/083696, filed on Jul. 10, 2015.

(51) Int. Cl.
*A61C 7/28* (2006.01)
*A61C 7/30* (2006.01)

(52) U.S. Cl.
CPC .............. *A61C 7/287* (2013.01); *A61C 7/30* (2013.01)

(58) Field of Classification Search
CPC .................... A61C 7/287; A61C 7/30
See application file for complete search history.

(56) References Cited

U.S. PATENT DOCUMENTS

| 5,322,435 A * | 6/1994 | Pletcher | A61C 7/30 433/10 |
| 5,466,151 A * | 11/1995 | Damon | A61C 7/146 433/10 |
| 6,071,118 A * | 6/2000 | Damon | A61C 7/287 433/10 |
| 7,267,545 B2 * | 9/2007 | Oda | A61C 7/287 433/10 |
| 8,029,276 B1 * | 10/2011 | Lokar | A61C 7/287 433/10 |

(Continued)

*Primary Examiner* — Yogesh P Patel
*Assistant Examiner* — Stephen R Sparks
(74) *Attorney, Agent, or Firm* — Wayne & Ken, LLC; Tony Hom

(57) ABSTRACT

The present invention discloses a passive self-ligating bracket, comprising a bracket body, wherein the middle part of the bracket body is sunken downwards to form an archwire slot; a locking piece in slide fit with the bracket body is arranged above the archwire slot; at least one locking position is provided on one of the bracket body and the locking piece; a fixing mechanism for fixing the locking piece at the locking position is arranged on one of the bracket body and the locking piece; the fixing mechanism comprises an elastic element located on one of the bracket body and the locking piece; the elastic element is provided with a bulge capable of being received at the locking position; when the locking piece is in a locked state, the bulge on the elastic element is received at the locking position; and when the locking piece is in an unlocked state, the end part of the bulge on the elastic element is in close abutment with one of the bracket body and the locking piece, and forces the elastic element to shrink and store energy. The present invention has the advantage of facilitating archwire installation.

5 Claims, 8 Drawing Sheets

(56) References Cited

U.S. PATENT DOCUMENTS

| | | | |
|---|---|---|---|
| 8,251,696 B2* | 8/2012 | Rodriguez | A61C 7/287 433/10 |
| 9,468,505 B2* | 10/2016 | Sommer | A61C 7/30 |
| 9,867,680 B2* | 1/2018 | Damon | A61C 7/287 |
| 9,895,207 B2* | 2/2018 | Damon | A61C 7/287 |
| 2004/0072117 A1* | 4/2004 | Farzin-Nia | A61C 7/20 433/10 |
| 2005/0239012 A1* | 10/2005 | Bathen | A61C 7/287 433/10 |
| 2006/0154196 A1* | 7/2006 | Oda | A61C 7/287 433/13 |
| 2007/0248928 A1* | 10/2007 | Damon | A61C 7/287 433/10 |
| 2009/0004619 A1* | 1/2009 | Oda | A61C 7/14 433/24 |
| 2010/0285420 A1* | 11/2010 | Oda | A61C 7/287 433/11 |
| 2014/0141383 A1* | 5/2014 | Hagelganz | A61C 7/30 433/9 |
| 2014/0272753 A1* | 9/2014 | Sommer | A61C 7/30 433/11 |
| 2015/0223913 A1* | 8/2015 | Yick | A61C 7/287 433/10 |
| 2016/0175072 A1* | 6/2016 | Andreiko | A61C 7/285 433/11 |
| 2016/0175073 A1* | 6/2016 | Huang | A61C 7/12 433/11 |
| 2017/0100217 A1* | 4/2017 | Lopes | A61C 7/14 |
| 2017/0119501 A1* | 5/2017 | Payne | A61C 7/30 |
| 2017/0143454 A1* | 5/2017 | Yick | A61C 7/30 |

* cited by examiner

PASSIVE SELF-LIGATING BRACKET

CROSS-REFERENCE TO RELATED APPLICATIONS

This application is a continuation of International Patent Application No. PCT/CN2015/083696 with an international filing date of Jul. 10, 2015 designating the United States, now pending. The content of the aforementioned application, including any intervening amendments thereto, is incorporated herein by reference.

TECHNICAL FIELD

The present invention relates to a dental orthodontic appliance, and more particularly relates to a passive self-ligating bracket.

BACKGROUND

Orthodontic treatment is a subdiscipline with a high specialization degree in the field of dentistry, and is mainly used for correction with regard to the deformities of teeth, jaw bones and faces, and the normal occlusion function of a patient is gradually recovered by installing and fixing an orthodontic appliance in the oral cavity. A bracket is an important component of the orthodontic appliance, and is mainly bonded onto anterior teeth, canine teeth and premolar teeth, and the orthodontic treatment is an operation of guiding staggered teeth to move to ideal positions by installing an orthodontic archwire in a ditch of the bracket.

A common bracket needs to be re-ligated when a doctor replaces an archwire during each subsequent visit, and lots of time will be spent; and because the archwire is ligated together with a bracket body, a friction force between the archwire and the bracket is high, so a correction force is increased, greater anchorage is needed, and the movement speed of teeth is also reduced.

The self-locking orthodontic bracket is a device made from a material such as metal or ceramic, and fixed on the surfaces of teeth by virtue of a special adhesive, and used for accommodating and fixing an orthodontic steel wire, and transferring the correction force to the teeth, thereby achieving the purpose of tooth correction.

The time of replacing the archwire during each subsequent visit can be saved by using the self-ligating bracket. Meanwhile, the archwire freely slides in the bracket slot, the friction force is low, the correction force is low, the patient has no obvious pain, and the movement speed of the teeth is increased, so the whole treatment cycle is shortened.

A locking piece on the self-ligating bracket will freely slide due to gravity in an unlocked state, thus the locking piece cannot be completely unlocked, and normal installation for the archwire is influenced.

SUMMARY

The present invention is to provide a passive self-ligating bracket which has the advantage of facilitating archwire installation.

In order to realize the above purpose, the present invention provides the following technical solution:

A passive self-ligating bracket comprises a bracket body, wherein the middle part of the bracket body is sunken downwards to form an archwire slot; a locking piece in slide fit with the bracket body is arranged above the archwire slot; at least one locking position is provided on one of the bracket body and the locking piece; a fixing mechanism for fixing the locking piece at the locking position is arranged on one of the bracket body and the locking piece; the fixing mechanism comprises an elastic element located on one of the bracket body and the locking piece; the elastic element is provided with a bulge capable of being received at the locking position; when the locking piece is in a locked state, the bulge on the elastic element is received at the locking position; and when the locking piece is in an unlocked state, the end part of the bulge on the elastic element is in close abutment with one of the bracket body and the locking piece, and forces the elastic element to shrink and store energy. Further, at least one anti-separating position is further provided on one of the bracket body and the locking piece; and an anti-separating mechanism used for defining a slide range of the locking piece on the bracket body to be between the anti-separating position and the locking position is further arranged on one of the bracket body, the locking piece and the elastic element.

Further, at least one anti-separating position is further provided on one of the bracket body and the locking piece; and an anti-separating mechanism used for defining a slide range of the locking piece on the bracket body to be between the anti-separating position and the locking position is further arranged on one of the bracket body, the locking piece and the elastic element.

Further, a slide groove for slide of the locking piece is arranged in the bracket body; groove rails are arranged at the two sides of the slide groove; slide bars in slide fit with the groove rails are arranged at the two sides of the locking piece; and the elastic element is embedded in the locking piece or the slide groove.

Further, the locking position is a through hole arranged in the sidewall of one groove rail; the elastic element is embedded in the bottom of the locking piece; when the locking piece is in the locked state, the bulge on the elastic element stretches into the through hole; and when the locking piece is in the unlocked state, the bulge on the elastic element is in close abutment with the sidewall of the groove rail.

Further, a concave groove is arranged in one of the slide groove and the locking piece; the anti-separating position is a sidewall, facing the archwire slot, of the concave groove; the anti-separating mechanism comprises a boss located on one of the slide groove, the locking piece and the elastic element; the boss is provided with a sidewall facing a direction opposite to the anti-separating position, and an inclined surface facing the archwire slot; and when the locking piece slides between the locking position and the anti-separating position, the boss is located in the concave groove.

Further, the concave groove is arranged in the bottom wall of the slide groove; the boss is embedded in the bottom of the locking piece and integrally connected with the elastic element; and when the locking piece slides between the locking position and the anti-separating position, one end away from the elastic element, of the boss, bulges out of the bottom of the locking piece and enters into the concave groove.

Further, ligating wings are arranged at the two sides of the archwire slot; the slide groove is arranged in one of the ligating wings; a concave shoulder is arranged on a sidewall facing the archwire slot, of the other ligating wing; and the locking piece is in close bonding with a table surface of the concave shoulder in the locked state.

Further, an operation groove is further arranged in one side away from the archwire slot, of the concave shoulder, and is communicated with the concave shoulder.

Further, a traction hook is further comprised, and arranged on the ligating wing at the same side where the slide groove is located.

Further, a traction hook is further comprised, and arranged on the ligating wing opposite to the slide groove.

Compared with the prior art, the present invention has the following advantages: the locking piece is capable of achieving the locked state through the fit between the bulge on the elastic element and the locking position; and when the locking piece is in the unlocked state, the bulge on the elastic element is in close abutment with the bracket body or the locking piece, and enables the elastic element to shrink and store energy, and at this moment, the counterforce of the elastic element enables the friction force between the bulge and the bracket body or the locking piece to be quite high, thus the locking piece can be located at any position, and then free slide of the locking piece due to the influence of gravity is avoided.

Figure 1:
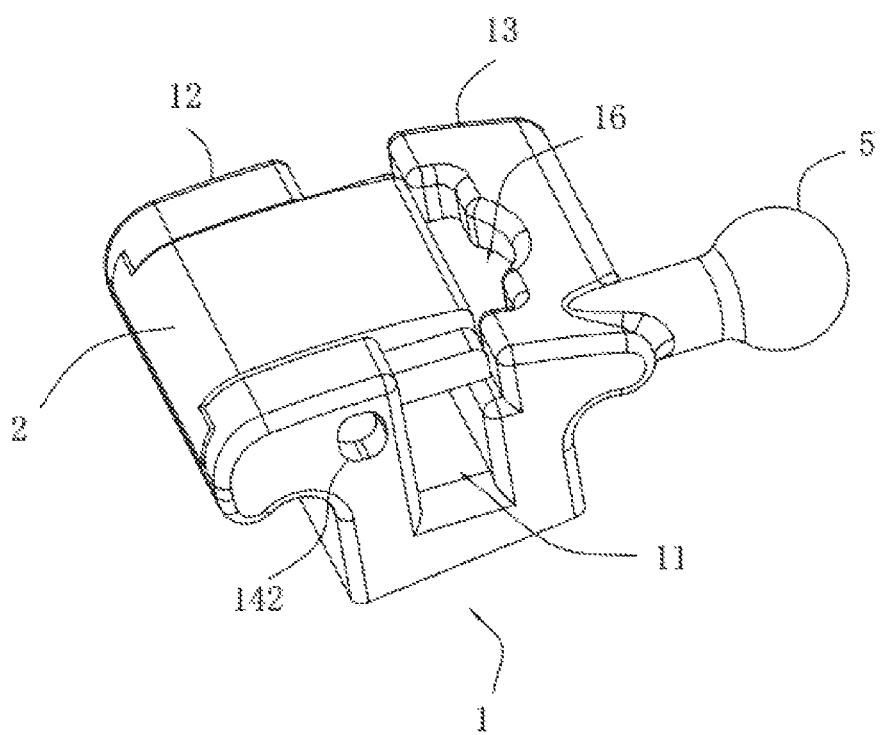
FIG. 1 is a schematic diagram when the locking piece is in the locked state in the present invention.

In the drawings: 1. bracket body, 11. archwire slot, 12. ligating wing. 13. ligating wing, 131. side wall of archwire slot; 14. slide groove, 141. groove rail, 142. through hole, 143. concave groove, 144. side wall of concave groove, 15. concave shoulder, 16. operation groove, 2. locking piece, 21. slide bar, 22. accommodating groove, 3. boss, 31. sidewall of boss, 32. inclined surface, 4. elastic element, 41. bulge, 42. fulcrum, 43. end point, 44. deformation part, 45. rod body, 5. traction hook, 6. archwire.

DETAILED DESCRIPTION

Figure 2:
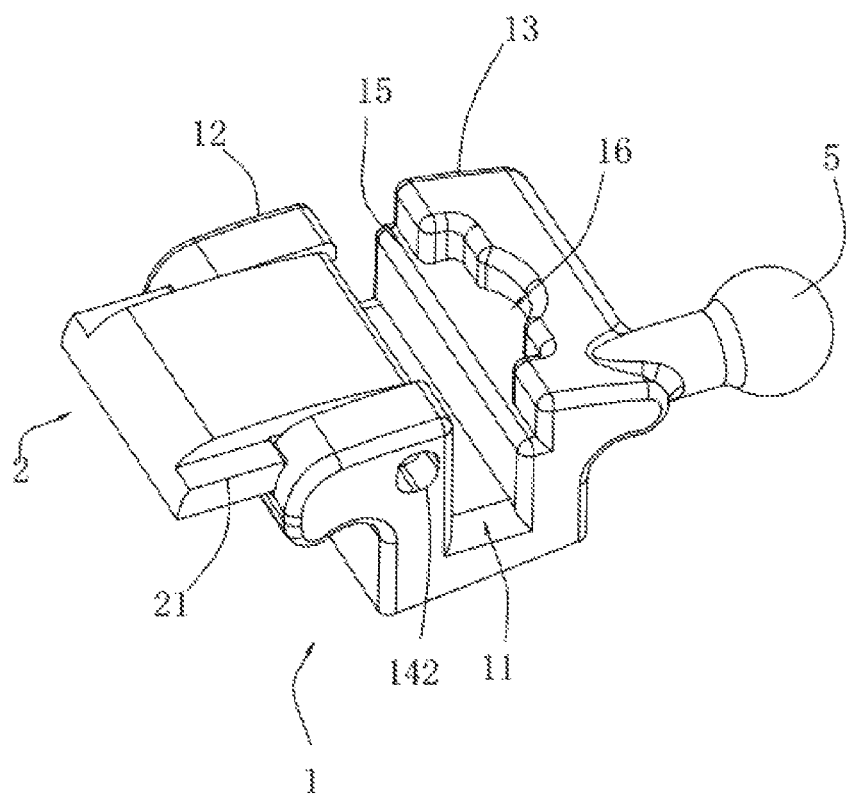
FIG. 2 is a schematic diagram when the locking piece is in the unlocked state in the present invention.

Referring to FIG. 1 and FIG. 2, a passive self-ligating bracket comprises a bracket body 1, wherein the middle part of the bracket body 1 is sunken downwards to form an archwire slot 11; and a locking piece 2 in slide fit with the bracket body 1 is arranged above the archwire slot 11. In the embodiment, a slide groove 14 for slide of the locking piece 2 is arranged in the bracket body 1; groove rails 141 are arranged at the two sides of the slide groove 14; slide bars 21 in slide fit with the groove rails 141 are arranged at the two sides of the locking piece 2; the locking piece is capable of sliding in the slide groove 14 through the it between the slide bars 21 and the groove rails 141; at least one locking position is arranged on one of the bracket body 1 and the locking piece 2; a fixing mechanism for fixing the locking piece 2 at the locking position is arranged on one of the bracket body 1 and the locking piece 2; the fixing mechanism comprises an elastic element 4 located on one of the bracket body 1 and the locking piece 2; the elastic element 4 is provided with a bulge 41 capable of being received at the locking position; when the locking piece 2 is in a locked state (refer to FIG. 1), the bulge 41 on the elastic element 4 is received at the locking position; and when the locking piece 2 is in an unlocked state (refer to FIG. 2), the end part of the bulge 41 on the elastic element 4 always keeps close abutment with one of the bracket body 1 and the locking piece 2, and enables the elastic element 4 to shrink and store energy, thus a friction force between the bulge 41 and the bracket body 1 or the locking piece 2 is quite high, the locking piece 2 can be kept at any position, and free slide of the locking piece under the action of gravity is avoided.

Figure 3:
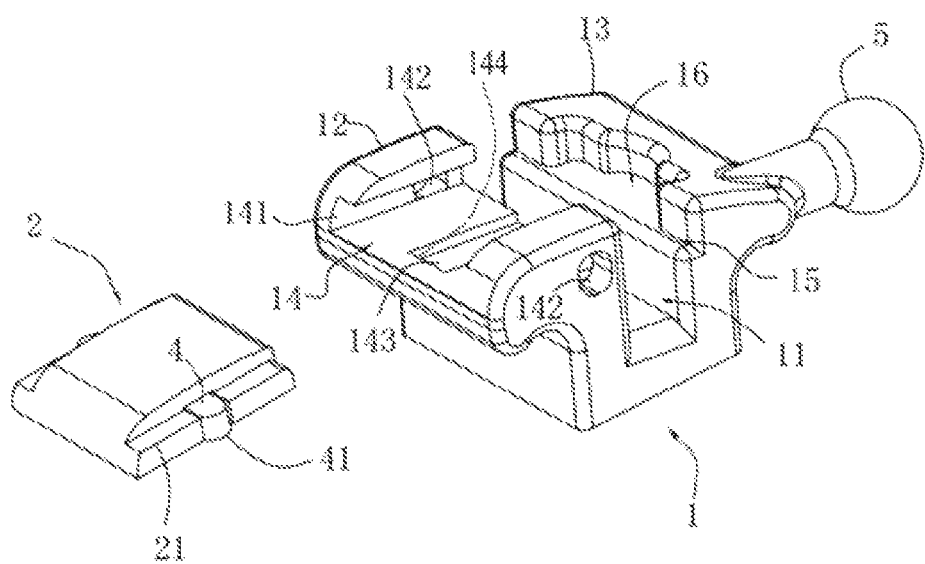
FIG. 3 is a schematic diagram when the locking piece is separated from the bracket body in the present invention.
Figure 4:
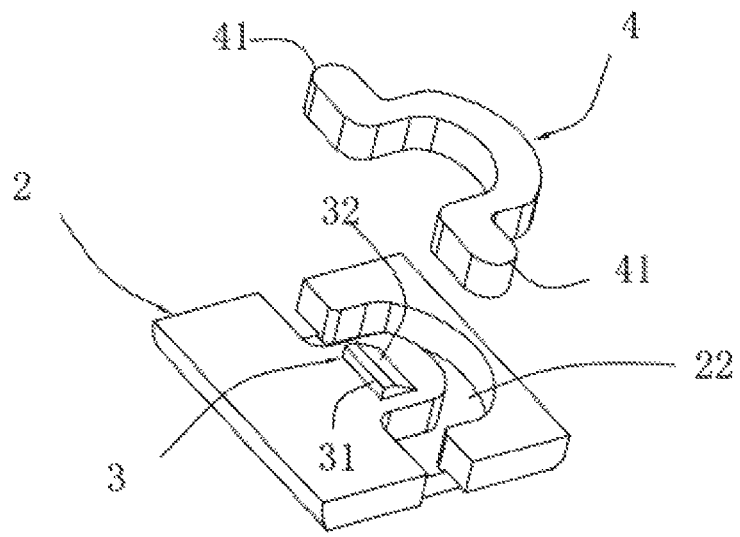
FIG. 4 is a schematic diagram when the elastic element is separated from the locking piece in the present invention.

In the embodiment, the locking position is a through hole 142 arranged in the sidewall of one groove rail 141; the elastic element 4 is embedded in the bottom of the locking piece 2, and refer to FIG. 3 herein; when the locking piece 2 is in the locked state, the bulge 41 on the elastic element 4 stretches into the through hole 142; and when the locking piece 2 is in the unlocked state, the bulge 41 on the elastic element 4 is in close abutment with the sidewall of the corresponding groove rail 141. FIG. 4 shows a structural diagram of the elastic element 4, the elastic element 4 is n-shaped as a whole, an accommodating groove 22 adaptive to the elastic element 4 is correspondingly arranged in the bottom of the locking piece 2; and the dimensions of the accommodating groove 22 should be slightly greater than those of the elastic element 4, so that the elastic element 4 has a deformation space to a certain extent. Bulges 41 are arranged at the two ends of the elastic element 4; when the locking piece 2 slides in the slide groove 14, the bulges 41 at the two ends of the elastic element 4 are abutted against the sidewall of the groove rail 141, so that the elastic element 4 is extruded to shrink, thus storing energy. In addition, the elastic element 4 adopted in the present invention, and the locking piece 2 are separately arranged, that is, the elastic element 4 is embedded in the bottom of the locking piece 2, therefore influence on the structural strength of the locking piece 2 is extremely low, the coverage area of the locking piece 2 itself for the archwire slot 11 can also be ensured, and then food debris can be prevented from directly entering into the archwire slot 11 from a space above the archwire slot 11, thus the health of the oral cavity is ensured.

Referring to FIG. 3, in order to prevent the whole locking piece 2 from sliding out of the slide groove 14, at least one anti-separating position is further arranged on one of the bracket body 1 and the locking piece 2; and an anti-separating mechanism used for defining a slide range of the locking piece 2 on the bracket body 1 to be between the anti-separating position and the locking position is further arranged on one of the bracket body 1, the locking piece 2 and the elastic element 4. A concave groove 143 is arranged in one of the slide groove 14 and the locking piece 2; in FIG. 3, the concave groove 143 is arranged in a bottom wall of the slide groove 14, the anti-separating position is a sidewall 144 facing the archwire slot 11, of the concave groove 143, and the anti-separating mechanism comprises a boss 3 located on one of the slide groove 14, the locking piece 2 and the elastic element 4; in order to ensure fit with the anti-separating position, the boss 3 is provided with a sidewall 31 facing a direction opposite to the anti-separating position, and an inclined surface 32 facing the archwire slot 11; and when the locking piece 2 slides between the locking position and the anti-separating position, the boss 3 is located in the concave groove 143. Take FIG. 4 for example, the boss 3 is arranged at the bottom of the locking piece 2, and provided with a sidewall 31 facing a direction opposite to the anti-separating position, and an inclined surface 32 facing the archwire slot 11; therefore, the locking piece 2 is kept between the anti-separating position and the locking position through the abutment relationship between the boss 3 and the sidewall 144 of the groove 143. When the locking piece 2 is installed, due to the existence of the boss 3, the locking piece 2 needs to be forcibly extruded into the slide groove 14 by a high force; however, the installation directions of the inclined surface 32 on the boss 3, and the locking piece 2 are the same, and the boss 3 is substantially elastic to a certain extent; therefore, the inclined surface 32 is conducive to installation for the locking piece 2. In the above-mentioned solution, because the boss 3 is equivalently embedded in the groove 143, during the actual production and manufacturing, the ligating wings can be made to be very thin; thus during an occlusion process of upper teeth and lower teeth of the patient, occlusion breakage for the bracket on the lower teeth due to contact between the brackets (including the locking piece 2) on the upper teeth and the lower teeth can be avoided, and then the times of replacing the whole self-ligating bracket can be reduced.

Figure 5:
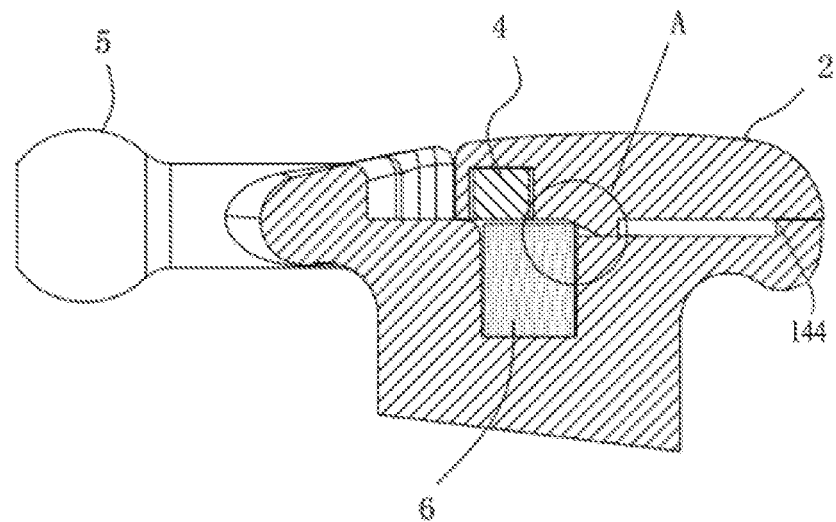
FIG. 5 is a section view of the self-locking bracket in the present invention.
Figure 6:
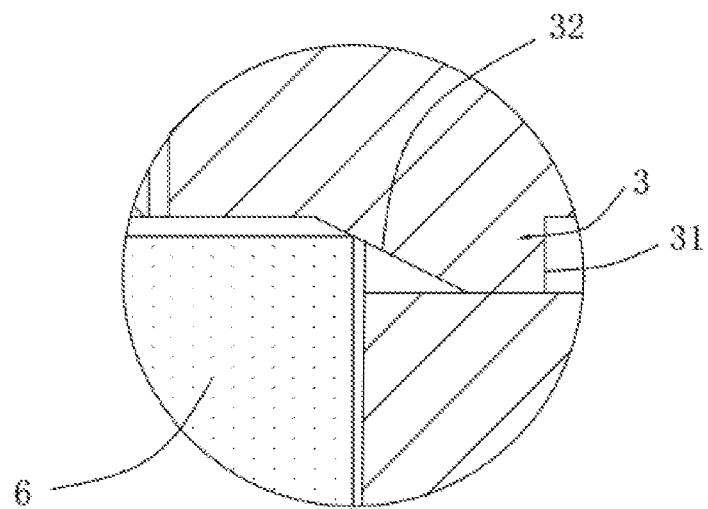
FIG. 6 is an enlarged view of a part A in FIG. 5 in the present invention.

In addition, because the inclined surface 32 is arranged at one side, facing the archwire slot 11, of the boss 3, during the actual manufacturing, the position of the boss 3 can be close to the archwire slot 11 to the greatest extent; as shown in FIG. 5 and FIG. 6, a part of the inclined surface 32 of the boss 3 already exceeds the range of the groove 143, and is located just above the archwire slot 11; and because the archwire 6 is approximately square (therefore, the archwire 6 is also called as a square wire), the top edge of the archwire 6 can be abutted against the inclined surface of the boss 3; that is to say, when the locking piece 2 is in the locked state, the inclined surface 32 of the boss 3 can be in close abutment with one side of the archwire 6 through properly adjusting the position of the boss 3, thus the archwire 6 is firmly pressed into the archwire slot 11 from another angle, and prevented from slide.

Figure 7:
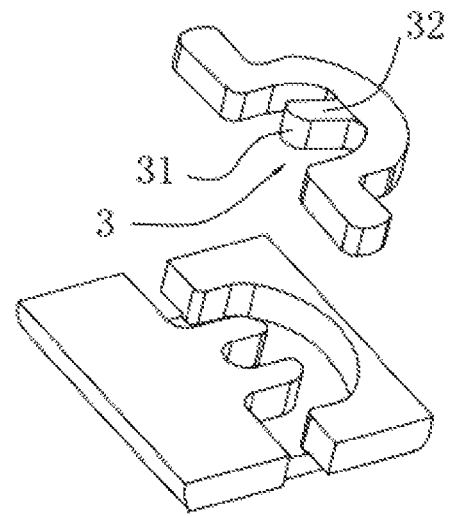
FIG. 7 is a schematic diagram when the boss and the elastic element are integrally arranged in the present invention.

FIG. 7 shows another position structure of the boss 3; the boss 3 is integrally connected with the elastic element 4; when the locking piece 2 slides between the locking position and the anti-separating position, one end away from the elastic element 4, of the boss 3, bulges out of the bottom of the locking piece 2 and enters into the concave groove 143. It can be seen from FIG. 7 that, the boss 3 and the elastic element 4 are arranged at a certain angle, and the boss 3 inclines towards a space above the accommodating groove 22, thus bulging out of the bottom of the locking piece 2; and then the boss 3 is provided with a sidewall 31 facing a direction opposite to the anti-separating position, and an inclined surface 32 facing the archwire slot 11.

Figure 8:
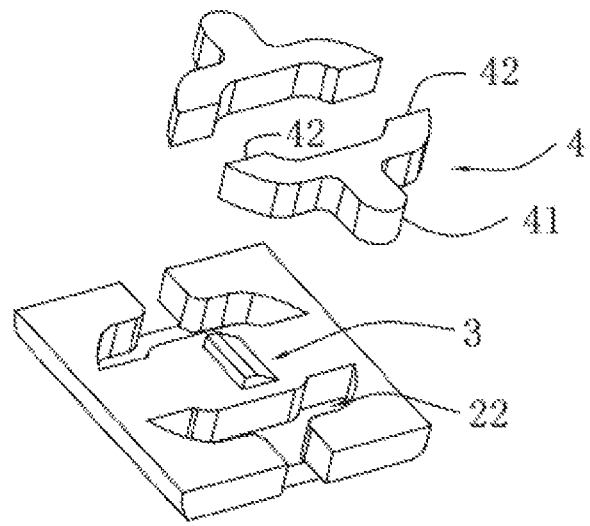
FIG. 8 to FIG. 10 show the structural schematic diagrams of the elastic element in three shapes respectively.

FIG. 8 shows another structural diagram of the elastic element 4; the elastic element 4 is V-shaped, and two elastic elements 4 are provided, and arranged at a left side and a right side; the boss 3 is arranged between the two elastic elements 4; and two fulcrums 42 of the elastic elements 4 are abutted against the sidewall 31 of the accommodating groove 32, thus deformations of the elastic elements 4 are facilitated.

Figure 9:
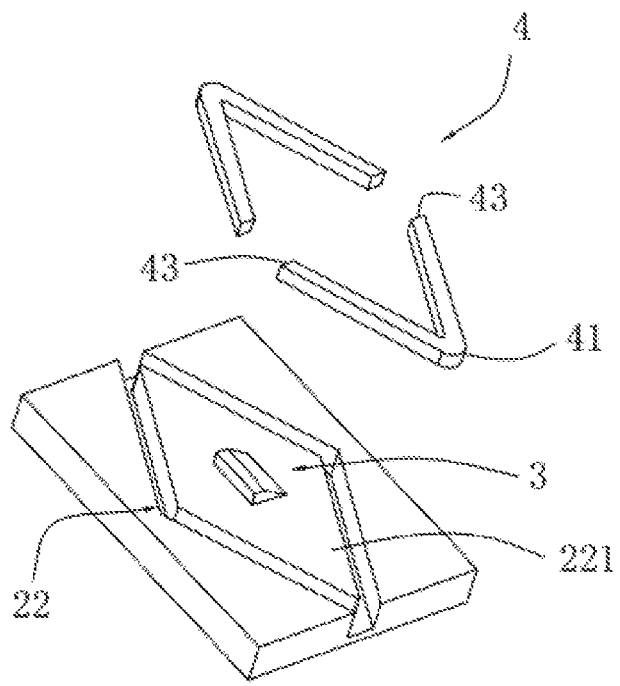

FIG. 9 shows another structural diagram of the elastic element 4; the elastic element 4 is V-shaped, and two elastic elements 4 are provided; a rhombic accommodating groove 22 is arranged in the bottom of the corresponding locking piece 2, so that a rhombic middle block is formed at the bottom of the locking piece 2; in a natural state, the inner angle of each V-shaped elastic element 4 is smaller than the acute angle of the middle block; then when each V-shaped elastic element 4 is placed in the rhombic accommodating groove 22, two end points 43 of each V-shaped elastic element 4 can be abutted against the sidewall 31 of the middle block, and each V-shaped elastic element 4 is expanded. Then when the included angle of each V-shaped elastic element 4 is abutted against the sidewall 31 of the corresponding groove rail 141, the V-shaped elastic element 4 itself retreats towards the interior of the accommodating groove 22, and then can be further expanded to store energy.

Figure 10:
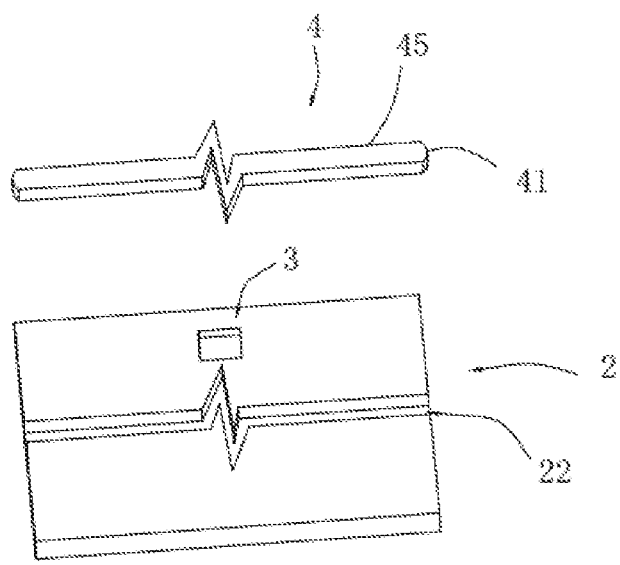
Figure 11:
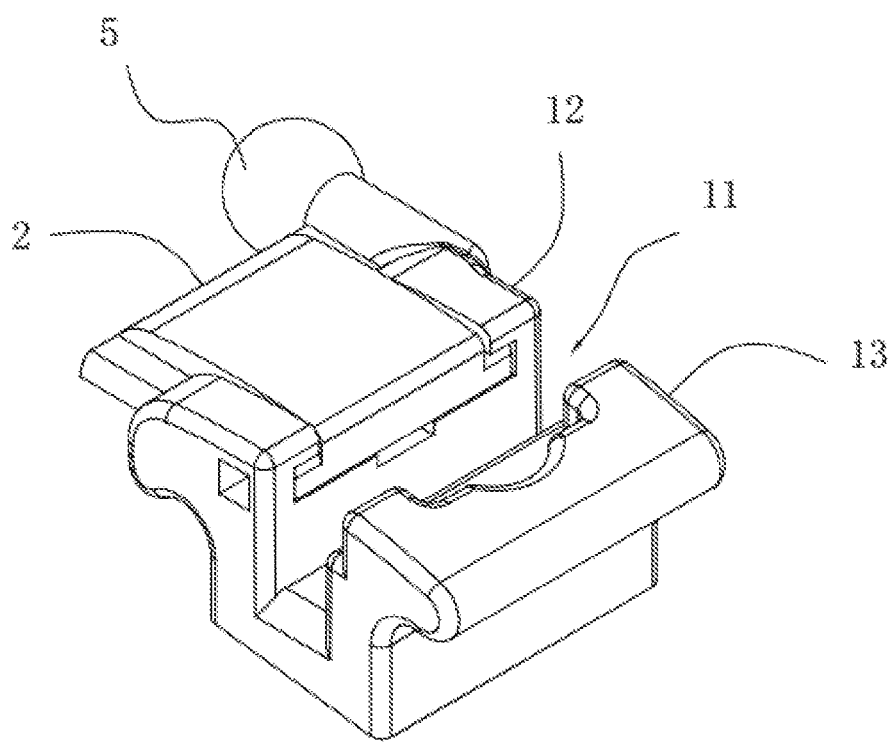
FIG. 11 to FIG. 12 are schematic diagrams of another installation position of the traction hook in the present invention.
Figure 12:
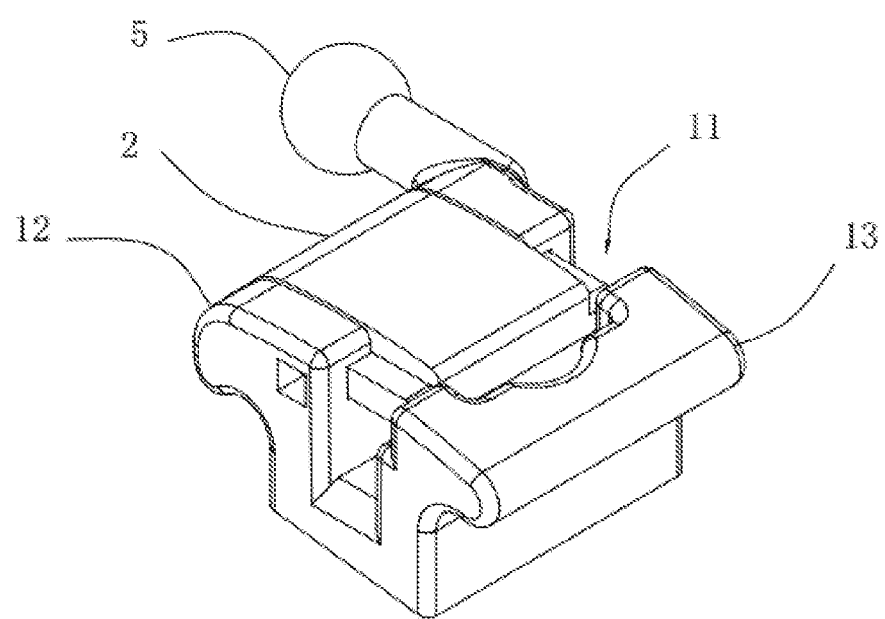

FIG. 10 shows another structural diagram of the elastic element 4; the elastic element 4 comprises two rod bodies 45 at the left side and the right side, and a deformation body 44 located between the two rod bodies 45, and connecting the two rod bodies 45; the deformation body 44 is in the shape of a broken line; and when the mutually-deviating end parts of the two rod bodies 45 are abutted against the sidewall 31 of the corresponding groove rail 141, the deformation body 44 shrinks to store energy.

Hereinafter, by referring to FIG. 3, further optimization implemented for the embodiment is illustrated:

Firstly, ligating wings (12, 13) are arranged at the two sides of the archwire slot 11, wherein, a concave shoulder 15 is arranged on the ligating wing 13 facing the archwire slot 11, of one ligating wing 13 opposite to the slide groove 14; and the locking piece 2 is in close bonding with a table surface of the concave shoulder 15 in the locked state. Arrangement of the concave shoulder 15 has the advantage that, the locking piece 2 can be bonded on the table surface of the concave shoulder 15 in the locked state to be supported to a certain extent, so that deformation of the end part of the locking piece 2 due to a high pressure can be prevented; in addition, although the locking piece 2 can be in close abutment with the ligating wing 13 which is not provided with the slide groove 14 in the locked state, after the bracket is used for a long time, a certain gap may occur between the locking piece 2 and the ligating wing 13 which is not provided with the slide groove 14, so that small food debris will enter into the wire groove; then through arranging the concave shoulder 15, the lower surface of the locking piece 2 can be in close bonding with the table surface of the concave shoulder, and even if the gap exists between the sidewall 31 of the locking piece 2 and the ligating wing 13 which is not provided with the slide groove 14, the food debris cannot directly enter into the archwire slot 11.

In addition, an operation groove 16 is further arranged in one side away from the archwire slot 11, of the concave shoulder 15, and is communicated with the concave shoulder 15. Arrangement of the operation groove 16 facilitates a tool to stretch into the operation groove 16 and push the locking piece 2 towards an opening direction during a subsequent visit.

By referring to FIG. 1 to FIG. 3 and FIG. 11 to FIG. 12, it can be seen that, a traction hook 5 is further arranged on the bracket body 1, and used for fixing a rubber band; and moreover, when in use, the traction hook 5 must face gingival. According to the bracket shown in FIG. 1 to FIG. 3, the traction hook 5 is arranged on the ligating wing 13 facing the slide groove 14, so that the opening direction of the locking piece 2 is jaw orientation; and according to the bracket shown in FIG. 11 to FIG. 12, the traction hook 5 is arranged on the ligating wing 12 at the same side where the slide groove 14 is located, so that the opening direction of the locking piece 2 is gingiva orientation.

The above only describes preferred embodiments of the present invention, the protection scope of the present invention is not merely limited thereto, and technical solutions under the concept of the present invention all belong to the protection scope of the present invention. It should be pointed out that, for those skilled in the art, several improvements and modifications made without departing from the principle of the present invention should also be incorporated in the protection scope of the present invention.

I claim:

1. A passive self-ligating bracket, comprising:
   a bracket body, wherein an archwire slot is formed at a middle part of the bracket body
   a locking piece provided with an accommodating groove,
   an elastic element detachably embedded in the accommodating groove, and
   a boss arranged on the elastic element;
   wherein the elastic element is n-shaped as a whole, the accommodating groove adaptive to the elastic element is correspondingly arranged in a bottom of the locking piece; dimensions of the accommodating groove are slightly greater than those of the elastic element so that the elastic element has a deformation space to a certain extent; a first ligating wing is arranged at one side of the archwire slot; and a second ligating wing is arranged at the other side of the archwire slot; the first ligating wing is provided with a slide groove; the slide groove at both sides is provided with groove rails; a concave groove is formed on a bottom of the slide groove;
   wherein the locking piece is provided with slide bars in slide fit with the groove rails, so that the locking piece is movable in the slide groove; the boss has a side wall and an inclined surface; and bulges are provided at ends of the elastic element;
   when the locking piece is in a locked state which closes the archwire slot, the bulges of the elastic element are received in through holes on the groove rails in a transverse direction that is parallel to the archwire slot; the inclined surface of the boss abuts against an edge of an archwire in the archwire slot at an angle, so that the archwire is fastened to the archwire slot;
   when the locking piece is in an unlocked state, the bulges of the elastic element is disengaged from the through holes, and the side wall of the boss abuts against a side wall of the concave groove to prevent the locking piece from sliding out of the slide groove;
   when the locking piece is in the unlocked state or slides in the slide groove, the bulges at the two ends of the elastic element abut against sidewalls of the groove rail, so that the elastic element is extruded to shrink, thus storing energy.

2. The passive self-ligating bracket of claim 1, further comprising a traction hook arranged on the second ligating wing opposite to the first ligating wing.

3. The passive self-ligating bracket of claim 1, wherein the second ligating wing is provided with a concave shoulder and an operation groove.

4. The passive self-ligating bracket of claim 3, wherein the operation groove has a mouth facing the locking piece and in communication with the concave shoulder; when the locking piece is in the locked state to close the archwire slot, the locking piece is in close bonding with a table surface of the concave shoulder, so that the concave shoulder provides a support for an end of the locking piece adjacent to the archwire slot.

5. The passive self-ligating bracket of claim 1, wherein the boss is integrally connected with the elastic element; the boss is provided with a sidewall facing a direction opposite to the anti-separating position, and an inclined surface facing the archwire slot; the locking piece is kept between the anti-separating position and the locking position through the abutment relationship between the boss and the sidewall of the groove.

* * * * *